(12) United States Patent
Kennedy

(10) Patent No.: US 10,004,206 B2
(45) Date of Patent: Jun. 26, 2018

(54) SHEEP AND GOAT CONTAINMENT CAGE (SHEEP CAGE)

(71) Applicant: James Kirk Kennedy, Burnet, TX (US)

(72) Inventor: James Kirk Kennedy, Burnet, TX (US)

(*) Notice: Subject to any disclaimer, the term of this patent is extended or adjusted under 35 U.S.C. 154(b) by 52 days.

(21) Appl. No.: 15/137,158

(22) Filed: Apr. 25, 2016

(65) Prior Publication Data

US 2017/0303500 A1    Oct. 26, 2017

(51) Int. Cl.
*A01K 1/06* (2006.01)
*A61D 3/00* (2006.01)

(52) U.S. Cl.
CPC .............. *A01K 1/0613* (2013.01); *A61D 3/00* (2013.01); *A61D 2003/003* (2013.01)

(58) Field of Classification Search
USPC ................................. 119/732, 736, 751, 752
See application file for complete search history.

(56) References Cited

U.S. PATENT DOCUMENTS

| | | | | |
|---|---|---|---|---|
| 427,145 | A * | 5/1890 | Bogard | A01K 1/0613 119/736 |
| 616,309 | A * | 12/1898 | Geddis | A01K 1/0613 119/734 |
| 3,037,482 | A * | 6/1962 | Jackson | A01K 1/0613 119/732 |
| 5,634,438 | A * | 6/1997 | Wilson | A61D 3/00 119/752 |
| 6,513,459 | B2 * | 2/2003 | Linn | A01K 1/0613 119/729 |
| 8,360,010 | B1 * | 1/2013 | Boaldin | A61D 3/00 119/729 |

FOREIGN PATENT DOCUMENTS

GB        2222064 A  *  2/1990  ............... A61D 3/00

OTHER PUBLICATIONS

Bill Stearman; "New, to Me, Sheep Handling Equipment;" from http://willowgardenshetlands.blogspot.com/2007/01/new-to-me-sheep-handlin . . . ; Jan. 6, 2007 (Year: 2007).*
Kenleighacres; "Stories from the Farm;" from https://kenleighacres.com/tag/sheep-handling/; Oct. 16, 2010. (Year: 2010).*
Three Willows Ranch; Head Gates and Cages; from http://www.threewillowsranch.com/head_gates_and_cages.html; accessed Oct. 24, 2017. (Year: 2017).*

* cited by examiner

*Primary Examiner* — Daniel James Colilla

(57) ABSTRACT

A rectangular shaped animal trapping cage with one side of the cage configured in two segments that can be swung toward the inside of the cage and locked to facilitate the immobilization of sheep and goat sized animals.

4 Claims, 3 Drawing Sheets

FIGURE 1 - Right Side of Sheep Cage, Which Includes Regular Exit Door
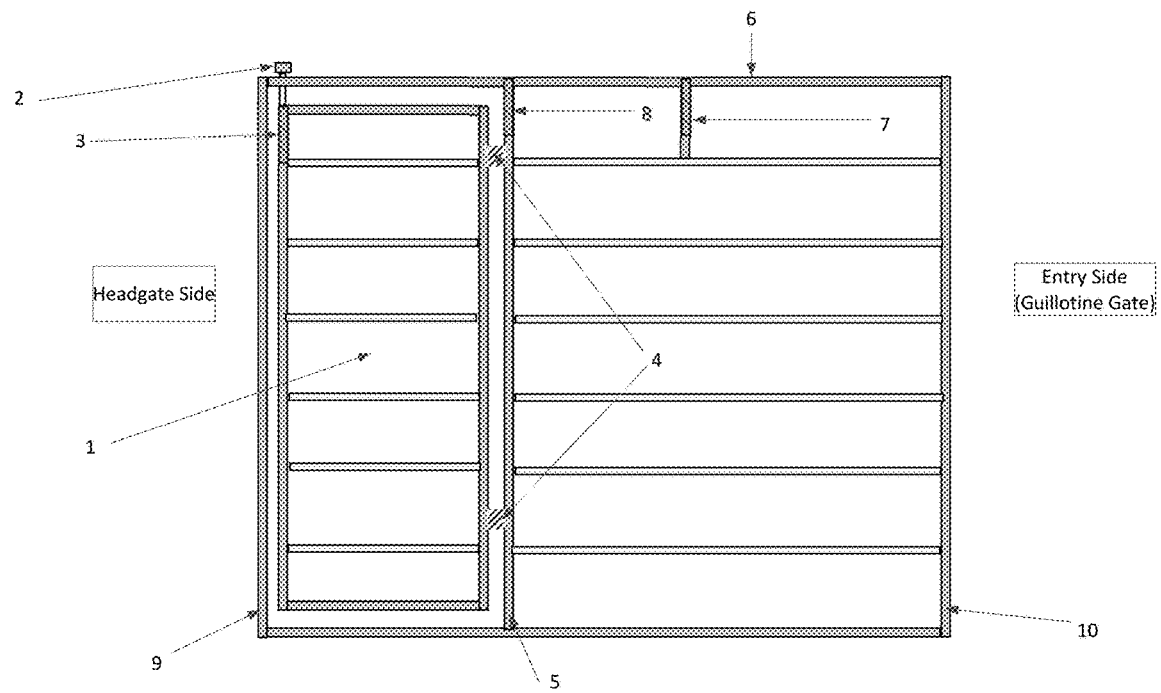
FIGURE 2 - Left Side of Sheep Cage, Which Includes Two Segmented Confining Gate
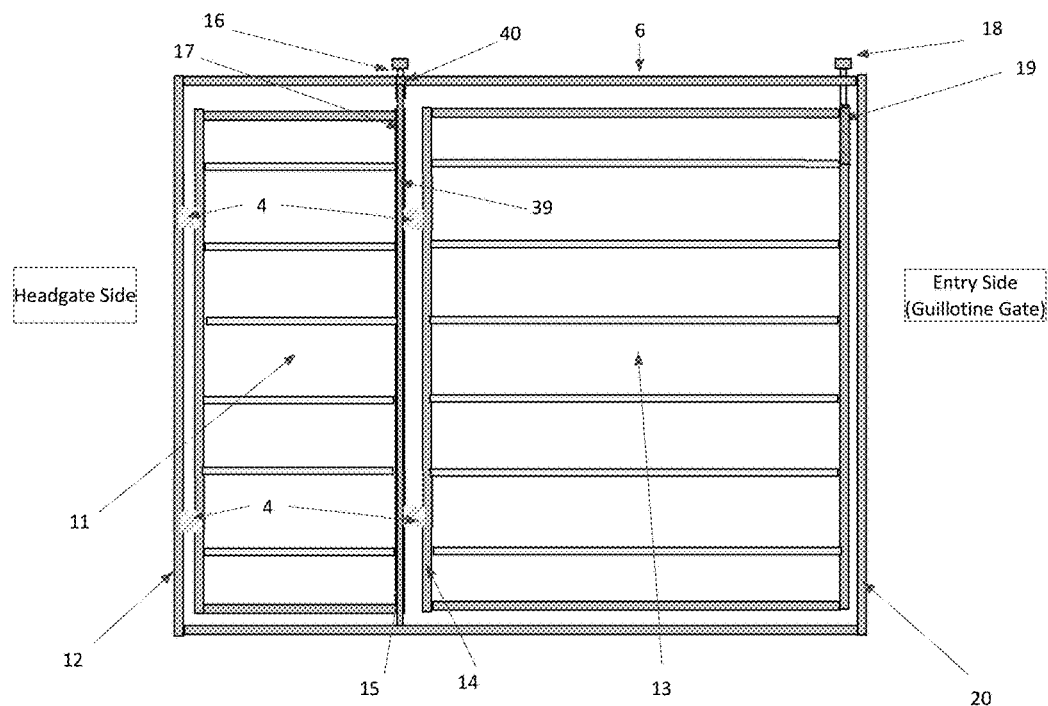

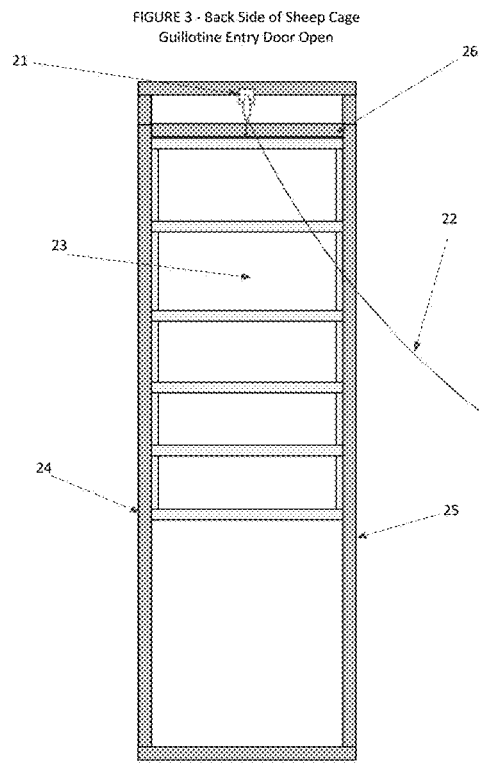
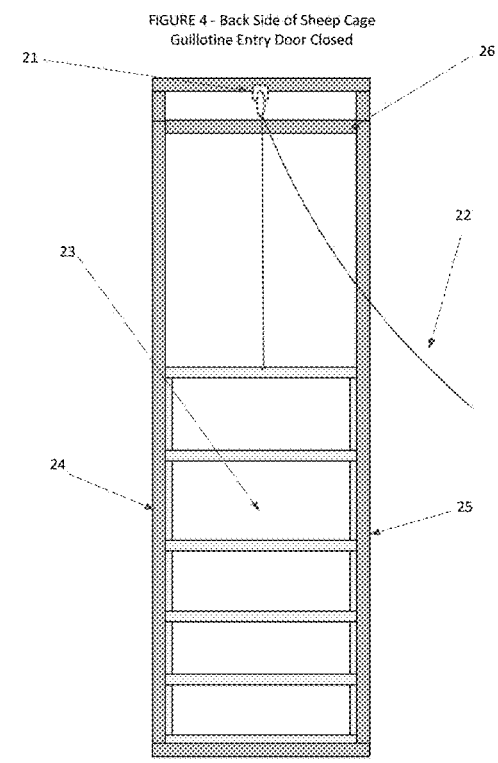
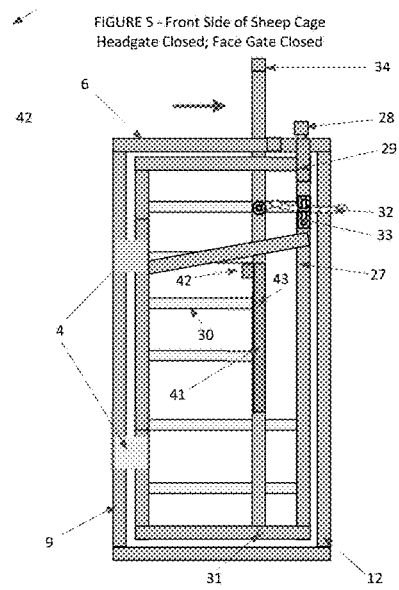
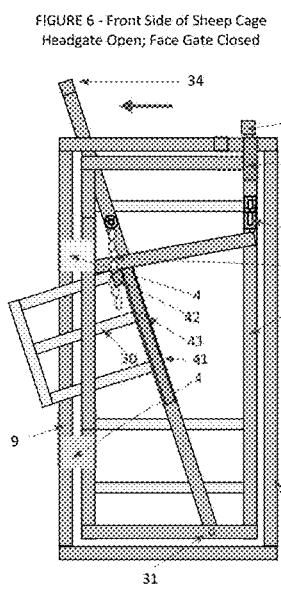
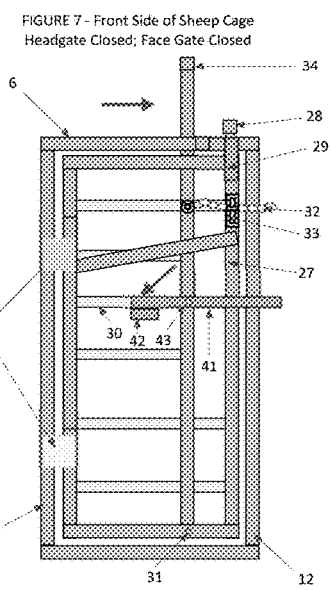

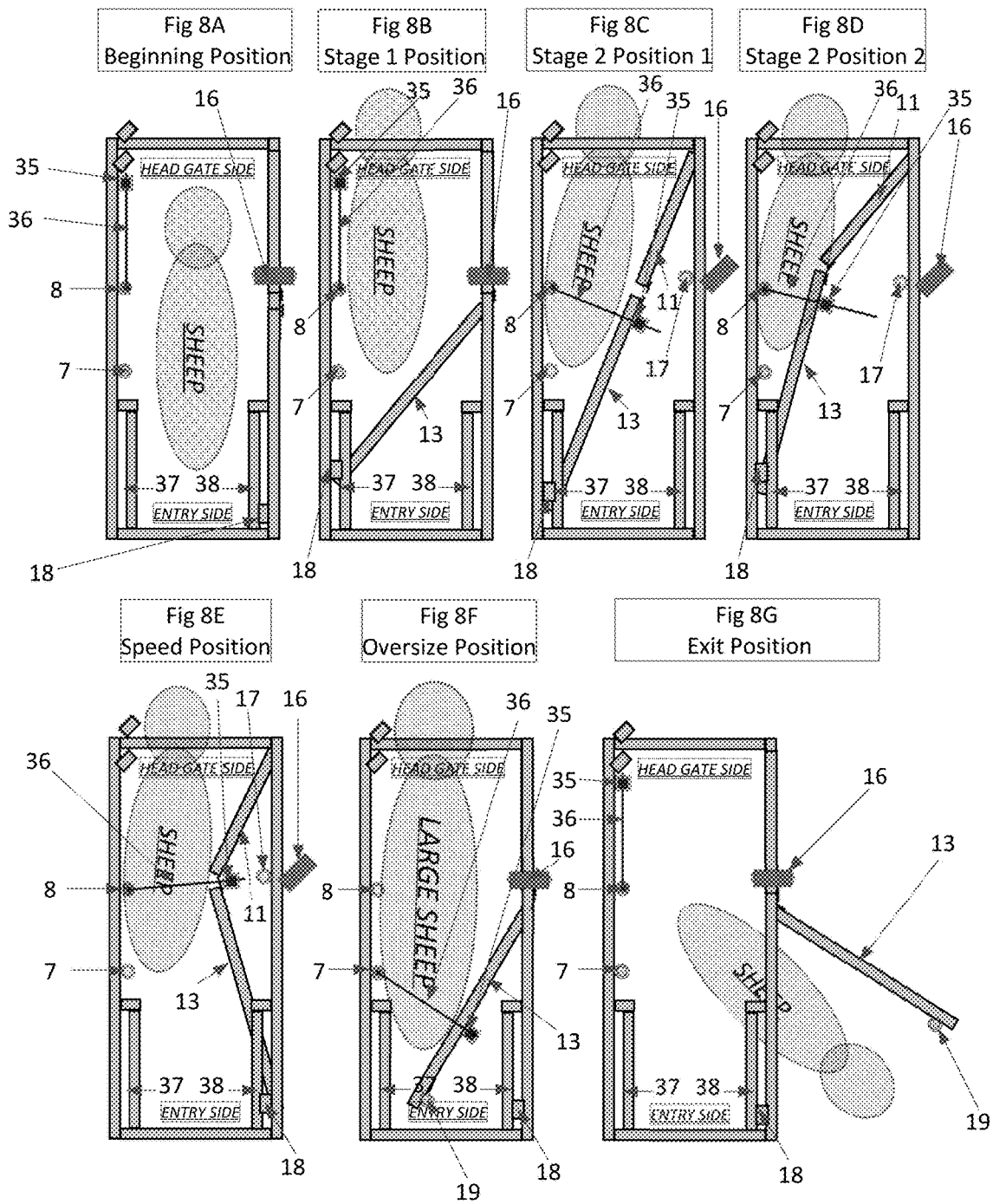

SHEEP AND GOAT CONTAINMENT CAGE (SHEEP CAGE)

The device is an implement for capturing, confining, and restraining sheep and/or goats to facilitate medical treatment and/or separating individual animals from larger flocks.

SUMMARY OF INVENTION

The Sheep and Goat Containment Cage is a rectangle shaped box made out of steel that is approximately 48 inches long, 18 inches wide (inside dimension), 40 inches tall, weighs approximately 200 lbs, and has fittings on all four outside corners than enable connection with readily available standard sheep and goat panels. It is constructed out of 1 ¼ and 1 inch square tubing and various small diameter steel pipe (1, ¾, ½). The cage has a guillotine entry door on one side (the 18 inch dimension) and a head gate on the opposite side, which is also hinged so that it can be used as an exit door.

Note: A guillotine door is a door that opens and closes by vertical movement. The door moves up (open) by applying force from above and down (closed) by allowing gravity to overcome the force otherwise holding the door open. A headgate is a gate or wall that has an opening in the midsection that is large enough for an animal to believe he can escape through, but has a mechanism that enables the operator to reduce the opening against an animal's neck once the animal's head goes through the gate but before the animal's shoulders go through the gate.

Each of the other two sides of the cage (48 inch dimensions) also have exit/access doors, one being a standard exit/access door 20 inches wide and the other door encompassing 30 inches of the other 48 inch side of the device. The 30 inch long exit door on the left side of the cage is constructed with special features that enable it to also serve as a confining gate, which enables the user to restrain sheep and goats to facilitate the application of medicine as well as sorting individual animals from larger groups.

Sheep and goats are becoming a popular livestock of choice for many small commercial ranchers as well as week-end ranch enthusiasts and market prices are continuing to increase for these ruminant species in response to the increasing demand. Because of sheep and goats' smaller physical size, lower cost per individual, higher reproduction rates, and ability to forage on brush and other low quality vegetation, these animals are often seen as a good fit for owners of small parcels of land near urban centers that may not have the expertise and staff to manage physically larger cattle. However, precisely because sheep and goats are smaller animals than cattle, producers have to deal with a larger number of individual animals in order to approach the economic potential of raising cattle. In addition the nature of sheep and goat's digestive and reproductive systems requires additional management, activities to treat internal parasites and assist with birthing. As with the productive management of any domesticated livestock, the heart of a management system to deal with sheep and goats needs involves a process to concentrate the animals in a small space and then employ the use of a chute or cage to restrain the animal so the owner can address the maintenance needs. However, most livestock equipment on the market today is built specifically to handle cattle, thus there is limited availability of equipment specifically designed to be used for sheep and goat sized animals. As a result of this, many sheep and goat operators are forced to either use makeshift handling equipment or try to adapt larger and more expensive equipment that was designed for the cattle industry.

BRIEF SUMMARY OF THE INVENTION

The Sheep and Goat Containment Cage is constructed of steel tubing and uses a series of simple hinged or gravity doors to accomplish entry, restraint, and release of any animal of the general size of a sheep or goat. Unlike similar livestock appliances designed for cattle, the Sheep and Goat Containment Cage is light enough to be lifted into the back of a pickup and transported to the intended location of use, and also includes removable wheels so that it can easily be rolled to the operator's exact optimal location. Once the desired placement has been accomplished, the wheels can be removed and stowed in the device for future use.

The Sheep and Goat Containment Cage is able to efficiently accomplish its intended use because of the innovative design of one of the sides of the device, called the confining gate. The confining gate consists of 2 separate segments, whose placement is moved through the various animal handling processes, conforming the inside of the rectangular main structure of the Sheep and Goat Containment Cage as a simple rectangular to facilitate entry and trapping of the animal at the beginning of the cycle and then culminating into total immobilization of the animal inside the Sheep and Goat Containment Cage by changing where the confining gate segments are latched.

OBJECTS AND ADVANTAGES OF THE INVENTION

Included among the objects and advantages of the invention are the ability to operate the device by a single individual, without the assistance from other individuals. This is enabled by using the rope to operate the vertical entry door from a remote location, allowing a single user to herd and trap an animal In the device. Another object of the invention is to perform all operator required actions, once the animal has entered the device, from a single location. This is enabled by convenient placement of all of levers, latch chains and latch pins within reach from a single location near the front of the device. A further object of the invention is to be able to use the same device to restrain animals of varying height, width and length. This is accomplished by the design and configuration of the two segmented confining gate, which can be placed in an almost unlimited number of positions within a few seconds, effectively changing the shape of the inside of the device in which the animal stands to whatever the operator desires. Another advantage of the device is the inclusion of the face gate, providing for complete restraining of the animal's face, which is the application location for most of the medical/maintenance needs being administered.

BRIEF DESCRIPTION OF THE DRAWINGS

FIG. 1 is the right side of sheep cage, which includes regular exit door.

FIG. 2 is the left side of sheep cage which includes two segmented confining gate.

FIG. 3 is the back side of sheep cage guillotine entry door open.

FIG. 4 is the back side of sheep cage guillotine entry door closed.

FIG. 5 is the front side of sheep cage headgate closed; face gate closed.

FIG. 6 is the front side of sheep cage headgate open; face gate closed.

FIG. 7 is the front side of sheep cage headgate closed; face gate closed.

FIG. 8A-8G is the top view of sheep cage showing the operation of the confining gate.

FIG. 8A the sheep cage in the beginning position.

FIG. 8B is the sheep cage in the stage 1 position.

FIG. 8c is the sheep cage in the stage 2, position 1.

FIG. 8D is the sheep cage in the stage 2, position 2.

FIG. 8E is the sheep cage in the speed position.
FIG. 8F is the sheep cage in the oversize position.
FIG. 8G is the sheep cage in the exit position.

DETAILED DESCRIPTION OF THE INVENTION

The operation of the Sheep and Goat Containment Cage is summarized as follows, with the operator positioning himself against the side of the regular exit/access door near the head gate window, across from the confining gate. Using the rope and pulley, the operator raises the guillotine entry gate and then lowers it after an animal enters. From this location, the head gate window is opened and the animal is encouraged to place its head through the head gate window, then the head gate window is closed against the animal's neck and secured with latch chain. The operator then reaches across the Sheep and Goat Containment Cage and lifts the latch pin from the end of the first segment of the confining gate (near the guillotine entry gate) and swings the end of the first segment of the confining gate toward the operator. Using the same latch pin, the operator pins the end of the first segment of the confining gate into a pin/slide assembly. This maneuver immediately changes the inside shape of the Sheep and Goat Containment Cage from a rectangle to smaller rectangle and a triangle, partially confining the animal. The operator then reaches across the Sheep and Goat Containment Cage and lifts the latch pin from the end of the second segment of the confining gate (approximately 20 inches from the head gate, where hinges are strategically located) and pulls both segments of the confining gates towards him until the Sheep and Goat Containment Cage shape is further reduced into a trapezoid and an even smaller triangle, depending on the size of the animal. The confining bar is then raised over the top of the either segment of the confining gate (regardless of where it is) to hold the confining gate in the desired position, then the face gate bar is moved from the vertical to horizontal position. At this point, the animal is completely immobilized, not being able to move from side to side or backup due to the confining gate position; and, not being able to move forward due to the animal's position in the head gate window and the position of the face gate bar. After the animal is in this position, the operator has full and unfettered access to the animal's mouth, eyes, and ears by standing or sitting in front of the Sheep and Goat Containment Cage. Additionally, the regular exit/access door can now be opened to gain access to the animal's front shoulders and abdomen. Finally, the rear of the animal can be accessed through the 5 inch gaps between the steel bars of the Sheep and Goat Containment Cage's rectangular main structure. All of the above access to the animal's various body locations can be made without fear of the animal being able to move and injure himself or the operator.

After the animal has been treated/inspected, the confining bar is released and swung out of the way, both segments of the confining gate are moved back to their initial positions and pinned, the face gate bar is returned to its vertical position and the head gate window is opened so that the animal can back out of the head gate window. At this point, the operator makes a determination as to how the animal should be grouped, then releases him out of the one of the three different exit gates; (1) head gate {exit door #1}, (2) first segment of the confining gate {exit door #2}, or (3) regular access gate {exit door #3}. This multiple exit door concept provides additional functionality for the Sheep and Goat Containment Cage in that once the animal enters, regardless of the treatment accomplished, the animal can be sorted into various management groups (sell, maintain in separate area for additional treatment, return to pasture, etc.).

DRAWINGS

FIG. 1—Right Side (includes Exit Gate #3)
The regular exit door 1 is attached to column 1 by hinge 4. Regular exit door 1 is opened by raising drop pin 2 so that it clears drop pin receiver 3 then regular exit 1 door is swung out from under top bar 6 away from main structure. Drop pin 2 is lowered back into receiver 3 while regular exit door 1 is held open. Regular exit door 1 is closed by raising drop pin 2 so that it clears receiver 3 and regular exit door 1 is swung to return under top bar then drop pin 2 is lowered into receiver 3 to secure regular exit door in the closed position.

FIG. 2—Left Side (includes Two Segmented Confining Gate/Exit Gate #2)
The confining gate serves as a confining gate when allowed to swing inside the main structure and also an exit gate when allowed to swing outside of the main structure. The first segment confining gate 13 is attached to second segment confining gate 11 with hinge 4 between column 14 and column 15. To operate as an exit door, first segment confining gate 13 is opened by raising drop pin 18 so that it clears receiver 19 then first segment confining gate 13 is swung out from under top bar 6 away from main structure. Drop pin 18 is lowered back into receiver 19 while first segment confining gate 13 is held open. First segment confining gate 13 is closed by raising drop pin 18 so that it clears receiver 19 and first segment confining gate 13 is swung to return under top bar 6 then drop pin 18 is lowered into receiver 19 to secure first segment confining gate 13 in the closed position. To operate both first segment confining gate 13 and second segment confining gate 11 in the complete confining gate function, see FIG. 8 and the associated description.

FIG. 3—Back Side (includes entry gate shown in open position)
The entry door 23 travels vertically between column 24 and column 25. Entry door 23 is opened by pulling on rope 22 which is threaded through pulley 21. Force is applied to rope 22 until entry door 23 is raised to contact top frame 26. Once entry door 23 makes contact with top frame 26, tension is maintained on rope 22 until animal enters main structure. After animal is inside main structure, entry door 23 is closed by reducing tension of rope 22 and allowing gravity to overcome entry gate 23 position in contact with top frame 26 so that entry gate 23 travels down to closed position.

FIG. 4—Back Side (includes entry gate shown in closed position)

FIG. 5 and FIG. 6—Front Side [Exit Gate #1] (includes head gate door, with head gate window shown closed in FIG. 5 and head gate widow open in FIG. 6)
Head gate door 27 (or third horizontal swinging gate) is attached to column 9 with hinges 4. Head gate door 27 is opened by raising drop pin 28 so that it dears receiver 29 then head gate door 27 is swung out from under top bar 6 away from main structure. Drop pin 28 is lowered back into receiver 29 while head gate door 27 is held open. Head gate door 27 is closed by raising drop pin 28 so that it dears receiver 29 and head gate door 27 is swung to return under top bar 6 then drop pin 28 is lowered into receiver 29 to secure head gate door 27 in the closed position.

Head gate window 30 rotates at Head gate Window pin 31. Head gate window 30 is opened by raising chain 32 from chain latch 33 and head gate window lever 34 is moved away from center of main structure. Animal's head and neck are directed between head gate post 27 and head gate window 30. Head gate window 30 is closed by moving head gate window lever 34 toward main structure until head gate window 30 contacts animals neck. Head gate window 30 is secured in closed position by engaging chain 32 into chain latch 33.

FIG. 7—Front Side [Exit Gate #1] (includes head gate door, with head gate window shown closed and face bar shown closed)

Head gate window 30 is shown in closed position. Face bar 41 rotates at Face bar pin 43. Face bar 41 is closed by pushing Face bar handle 42 to the left down to the horizontal position then pivoting Face bar handle 42 toward Head gate window 30 which latches face bar 41 in the horizontal position.

FIG. 8—Top Side (includes views of each cycle/position of the Two Segmented Confining Gate)

The various cycles of the confining gate segments are depicted in FIG. 6. FIGS. 6A, 6B, 6C, and 6D depict the first segment confining gate 13 and second segment confining gate 11 as they move through various positions to accomplish the immobilization of sheep and goat sized animals. FIGS. 6E and 6F depict alternate positions of first segment confining gate 13 and second segment confining gate 11 that can be used for faster but less immobilization of animals (6E) and confining unusually large specimens (6F). Finally, FIG. 6G depicts the use of the first segment confining gate 13 as an alternate exit gate, which is more completely described in the description associated with FIG. 2.

FIG. 8A. (Stage 0 position) Animal contained in main structure. First segment confining gate 13 and second segment confining gate 11 in closed position.

FIG. 8B. (Stage 1 position) Front of animal has been secured with head gate window 30. First segment confining gate 13 is used to reduce the area inside main structure by raising latch pin 18 from receiver 19 and swinging first segment confining gate 13 across main structure and placing latch pin 18 through first segment confining slide 37 and back into receiver 19.

FIG. 8C. (Stage 2 position) Front of animal has been secured with head gate window 30. First segment confining gate 13 is used to reduce the area inside main structure by raising latch pin 18 from receiver 19 and swinging first segment confining gate 13 across main structure and placing latch pin 18 through first segment confining slide 37 and back into receiver 19. Latch pin 16 is raised from receiver 17 and stowed in receiver 40, then second segment confining gate 11 is swung toward the inside of the main structure. As first segment confining gate 13 and second segment confining gate 11 move toward inside of main structure, first segment confining slide 37 allows first segment confining gate 13 and second segment confining gate 11 to accommodate almost any angle of movement between first segment confining gate 13 and second segment confining gate 11, providing the ability to further reduce the area inside main structure. Confining bar 35 is placed in first confining bar receiver 8 and confining bar clamp 36 is adjusted to hold first segment confining gate 13 and second segment confining gate 11 in desired position.

FIG. 8D. (Extreme Stage 2 position). Same as described in FIG. 6C but demonstrates the ability to completely immobilize animal by adjusting confining bar clamp 36 on confining bar 35 until first segment confining gate 13 and second segment confining gate 11 contact the animals body.

FIG. 8E. (Speed Stage 2 position). Front of animal has been secured with head gate window 30. Latch pin 16 is raised from receiver 17 and stowed in receiver 40, then first segment confining gate 13 and second segment confining gate 11 are swung toward the inside of the main structure. As first segment confining gate 13 and second segment confining gate 11 move toward inside of main structure, confining slide 38 allows first segment confining gate 13 and second segment confining gate 11 to accommodate almost any angle of movement between first segment confining gate 13 and second segment confining gate 11, providing a quick side to side confinement of the animal.

FIG. 8F. (Oversize Stage 2 position). Front of animal has been secured with head gate window 30. First segment confining gate 13 is used to reduce the area inside main structure by raising latch pin 18 from receiver 19 and swinging first segment confining gate 13 across main structure until contact is made with the animal's body. Confining bar 35 is placed in confining bar receiver 7 and confining bar clamp 36 is adjusted to hold first segment confining gate 13 in desired position FIG. 8G. (Exit Position). Depiction of first segment confining gate 13 used as an exit gate, described is FIG. 2.

The following is claimed:

1. A sheep and goat confinement cage having a three dimensional rectangular main structure suitable for temporarily confining sheep or goat sized animals for the purposes of administering medicines, deworming, sorting, or providing birthing assistance, the sheep and goat confinement cage comprising:

a) tubing construction comprised of a plurality of spaced tubes such that space between each tube affords clearance so the operator can access an animal's body between the tubes but with same clearance limited so the animal cannot exit through said spaced tubes;

b) an open bottom so that the confined animal stands on the ground in which the said cage is placed;

c) an open top so that the confined animal can be viewed and accessed by the operator;

d) a vertical opening entry gate forming the rear of the rectangular main structure, having the capability to be opened and closed using a rope from a remote location;

e) three different horizontal swinging gates, forming the front and sides of the rectangular main structure which accomplish various animal restraint positions, and which also can be opened to facilitate multiple release locations of subject animal after the confinement purpose has been accomplished, wherein a second of said horizontal swinging gates is comprised of two segments pivotally attached to one another and with both segments being capable of swinging toward the inside of the rectangular main structure and a rear segment of the two segments being capable of swinging to the outside of the rectangular main structure to serve as an additional exit gate.

2. The sheep and goat confinement cage according to claim 1, wherein a first of said three horizontal swinging gates forms the front of the rectangular main structure and has a head gate window apparatus inside the first gate comprising a pivoting head gate window, operator lever, and latch chain whereby the head gate window apparatus can be manipulated to confine the neck and head of an animal in a horizontal position; said head gate window apparatus also including a face bar apparatus which can be manipulated to confine the neck and face of an animal in a vertical position.

3. The sheep and goat confinement cage according to claim 1, wherein the second of said three horizontal swinging gates forms one entire side of the rectangular main structure and wherein the sheep and goat confinement cage further comprise one pin/receiver, two slide/pin receivers, a confining bar and a confining bar clamp wherein the two segments can be manipulated to crowd the middle and rear body of an animal by reducing the open space inside the rectangular main structure.

4. The sheep and goat confinement cage according to claim 1, wherein a third of said three swinging gates forms a part of a side of the rectangular main structure and is capable of being swung away from the rectangular main structure to serve as an additional access area to the animal's body after full immobilization of the animal is accomplished.

* * * * *